(12) United States Patent
Ide et al.

(10) Patent No.: US 10,780,430 B2
(45) Date of Patent: Sep. 22, 2020

(54) SEQUENTIAL IMPREGNATION FOR NOBLE METAL ALLOY FORMATION

(71) Applicant: ExxonMobil Research and Engineering Company, Annandale, NJ (US)

(72) Inventors: Matthew S. Ide, Hillsborough, NJ (US); Stephen J. McCarthy, Center Valley, PA (US); Gary P. Schleicher, Milford, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 249 days.

(21) Appl. No.: 15/381,570

(22) Filed: Dec. 16, 2016

(65) Prior Publication Data

US 2017/0182484 A1    Jun. 29, 2017

Related U.S. Application Data

(60) Provisional application No. 62/271,499, filed on Dec. 28, 2015.

(51) Int. Cl.
*B01J 29/74* (2006.01)
*B01J 37/02* (2006.01)
(Continued)

(52) U.S. Cl.
CPC ......... *B01J 29/7461* (2013.01); *B01J 29/042* (2013.01); *B01J 29/068* (2013.01);
(Continued)

(58) Field of Classification Search
CPC .... B01J 29/7461; B01J 29/072; B01J 29/068; B01J 29/042; B01J 29/74; B01J 37/08;
(Continued)

(56) References Cited

U.S. PATENT DOCUMENTS 3,354,078 A    11/1967 Miale et al.
5,384,038 A    1/1995 Galperin
(Continued)

OTHER PUBLICATIONS

Rafael Roldán et al, Effect of the impregnation order on the nature of metal particles of bi-functional Pt/Pd-supported zeolite Beta materials and on their catalytic activity for the hydroisomerization of alkanes, Journal of Catalysis, vol. 254, Issue 1, pp. 12-26 (Year: 2008).*

(Continued)

*Primary Examiner* — Randy Boyer
*Assistant Examiner* — Juan C Valencia
(74) *Attorney, Agent, or Firm* — Robert A. Migliorini; Scott F. Yarnell

(57) ABSTRACT

Methods are provided for forming noble metal catalysts comprising both platinum and a second Group VIII metal, such as palladium, with improved aromatic saturation activity. Instead of impregnating a catalyst with both platinum and another Group VIII metal at the same time, a sequential impregnation can be used, with the Group VIII metal being impregnated prior to platinum. It has been discovered that by forming a Group VIII metal-impregnated catalyst first, and then impregnating with platinum, the distribution of platinum throughout the catalyst can be improved. The improved distribution of platinum can result in a catalyst with enhanced aromatic saturation activity relative to a catalyst with a similar composition formed by simultaneous impregnation.

20 Claims, 6 Drawing Sheets

(51) Int. Cl.
| | |
|---|---|
| *B01J 37/08* | (2006.01) |
| *C10G 65/00* | (2006.01) |
| *C10G 45/54* | (2006.01) |
| *C10G 45/64* | (2006.01) |
| *C10G 45/12* | (2006.01) |
| *C10G 45/52* | (2006.01) |
| *C10G 47/18* | (2006.01) |
| *C10G 45/10* | (2006.01) |
| *C10G 65/04* | (2006.01) |
| *C10G 45/62* | (2006.01) |
| *B01J 29/072* | (2006.01) |
| *B01J 29/068* | (2006.01) |
| *B01J 29/04* | (2006.01) |

(52) U.S. Cl.
CPC ............ *B01J 29/072* (2013.01); *B01J 29/74* (2013.01); *B01J 37/024* (2013.01); *B01J 37/08* (2013.01); *C10G 45/10* (2013.01); *C10G 45/12* (2013.01); *C10G 45/52* (2013.01); *C10G 45/54* (2013.01); *C10G 45/62* (2013.01); *C10G 45/64* (2013.01); *C10G 47/18* (2013.01); *C10G 65/00* (2013.01); *C10G 65/043* (2013.01); *B01J 2229/186* (2013.01); *C10G 2400/04* (2013.01); *C10G 2400/10* (2013.01)

(58) Field of Classification Search
CPC ... B01J 37/024; B01J 2229/186; C10G 45/54; C10G 45/52; C10G 45/12; C10G 65/043; C10G 45/10; C10G 65/00; C10G 47/18; C10G 45/64; C10G 45/62; C10G 2400/10; C10G 2400/04
See application file for complete search history.

(56) References Cited

U.S. PATENT DOCUMENTS

| | | | |
|---|---|---|---|
| 5,951,848 | A | 9/1999 | Baker, Jr. et al. |
| 6,136,181 | A | 10/2000 | Ziemer |
| 8,298,403 | B2 | 10/2012 | Elia et al. |
| 8,425,762 | B2 | 4/2013 | McCarthy et al. |
| 8,431,014 | B2 | 4/2013 | Krishna et al. |
| 8,545,694 | B2 | 10/2013 | McCarthy et al. |
| 8,546,286 | B2 | 10/2013 | McCarthy et al. |
| 8,840,779 | B2 | 9/2014 | McCarthy et al. |
| 2006/0070916 | A1 | 4/2006 | McCarthy et al. |
| 2006/0211902 | A1 | 9/2006 | Xiao et al. |
| 2006/0229192 | A1 | 10/2006 | McCarthy et al. |
| 2006/0229198 | A1* | 10/2006 | McCarthy ............... B01J 29/041 502/325 |
| 2010/0187156 | A1 | 7/2010 | Prentice et al. |
| 2011/0079540 | A1* | 4/2011 | Krishna ................... B01J 21/04 208/58 |
| 2011/0180453 | A1 | 7/2011 | Elia et al. |
| 2011/0192766 | A1 | 8/2011 | McCarthy et al. |
| 2013/0261364 | A1 | 10/2013 | Ercan et al. |
| 2013/0264246 | A1 | 10/2013 | Holtzer et al. |
| 2014/0024868 | A1 | 1/2014 | Lai et al. |
| 2014/0274664 | A1 | 9/2014 | Weigel et al. |
| 2015/0175911 | A1 | 6/2015 | Shih et al. |

OTHER PUBLICATIONS

The International Search Report and Written Opinion of PCT/US2016/067166 dated Mar. 24, 2017.
The International Search Report and Written Opinion of PCT/US2016/067175 dated Apr. 12, 2017.
Miale, J.N. et al., "Catalysis by Crystalline Aluminosilicates", Journal of Catalysis, 1966, vol. 6, pp. 278-287.
Mokaya, Robert et al., "Acidity and catalytic activity of the mesoporous aluminosilicate molecular sieve MCM-41", Catalysis Letters, 1996, vol. 37, pp. 113-120.
Molinari, E. et al., "A Kinetic Study of the Slow Rise and Decay of the Photoconductivity in Zinc Oxide", Journal of Catalysis, 1965, vol. 4, p. 415-429.
Olson, D.H. et al., "Chemical and Physical Properties of the ZSM-5 Substitutional Series", Journal of Catalysis, 1980, vol. 61, pp. 390-396.
Park, Kwang-Cheon et al., "Characteristics of Al-MCM-41 supported Pt catalysts: effect of Al distribution in Al-MCM-41 on its catalytic activity in naphthalene hydrogenation", Catalysis Today, 2002, vol. 74, pp. 281-290.
Pawelec, B. et al., "Structural and surface features of PtNi catalysts for reforming of methane with CO2", Applied Catalysis A: General, 2007, vol. 323, pp. 188-201.
Roldan, Rafael et al., "Effect of the impregnation order on the nature of metal particles of bi-functional Pt/Pd-supported zeolite Beta materials and on their catalytic activity for the hydroisomerization of alkanes", Journal of Catalysis, 2008, vol. 254, pp. 12-26.
Sakthivel, A. et al., "The influence of aluminium sources on the acidic behaviour as well as on the catalytic activity of mesoporous H-AlMCM-41 molecular sieves", Microporous and Mesoporous Materials, 2003, vol. 65, pp. 177-187.
Wang, Jun et al., "Acid function of Al-MCM-41 supported platinum catalysts in hydrogenation of benzene, toluene and o-xylene", Catalysis Letters, 1998, vol. 55, pp. 157-163.
Turaga, U. et al., "Deep Hydrodesulfurization of Diesel and Jet Fuels Using Mesoporous Molecular Sieve-Supported Co—Mo/MCM-41 Catalysts" ACS Division of Petroleum Chemistry, Inc. Preprints, ACS 222nd National Meeting, 2001, vol. 46, Issue 3, pp. 275-279, Abstract.
The Communication pursuant to Article 94(3) EPC dated Aug. 1, 2019 p. 10.

* cited by examiner

SEQUENTIAL IMPREGNATION FOR NOBLE METAL ALLOY FORMATION

CROSS-REFERENCE TO RELATED APPLICATIONS

This application claims priority to U.S. Provisional Application Ser. No. 62/271,499 filed Dec. 28, 2015, which is herein incorporated by reference in its entirety.

This application is related to a co-pending U.S. application, filed on an even date herewith, and identified by Ser. No. 15/381,549 (entitled "DEWAXING CATALYST WITH IMPROVED AROMATIC SATURATION ACTIVITY"), which is incorporated herein by reference in its entirety.

FIELD

Methods are provided for impregnation of noble metals on hydroprocessing catalysts.

BACKGROUND

Platinum is a commonly used metal for hydrogenation and dehydrogenation reactions during catalytic processing of hydrocarbonaceous feeds. Although platinum has a lower resistance to poisoning by sulfur, for sufficiently clean feeds platinum can provide a superior level of catalytic activity relative to base metals and/or palladium. In some situations, alloys of platinum and palladium can be used, in an effort to provide activity similar to platinum while retaining some desirable properties of palladium. Conventionally, dispersion of platinum on a catalyst is used as an indicator of whether a suitable distribution of platinum has been achieved on a catalyst.

U.S. Pat. No. 8,546,286 describes methods for preparing hydrogenation catalysts. Prior to impregnation of a catalyst with Pt and/or Pd, an anchoring compound is deposited on the catalyst. The anchoring compound reduces or minimizes the tendency for noble metals deposited on the catalyst to agglomerate over time.

SUMMARY

In one aspect, a method of making a supported catalyst is provided. The method includes impregnating a support comprising at least one of a zeolitic support and a mesoporous support with a Group VIII metal salt, such as a palladium salt. The support can be calcined under first effective calcining conditions to form a Group VIII metal-impregnated catalyst. The Group VIII metal-impregnated catalyst can then be impregnated with a platinum salt. The Group VIII metal-impregnated catalyst can then be calcined under second effective calcining conditions to form a platinum- and Group VIII metal-impregnated catalyst. The platinum- and Group VIII metal-impregnated catalyst can have a combined amount of platinum and Group VIII metal of 0.1 wt %-5.0 wt % based on the weight of the supported catalyst. The platinum- and Group VIII metal-impregnated catalyst can be used, for example, to hydroprocess a feed having an aromatics content of at least 5 wt % to form a hydroprocessed effluent.

In another aspect, a supported catalyst is provided. The supported catalyst can include a support comprising at least one of a zeolitic support and a mesoporous support. The supported catalyst can further include 0.1 wt % to 5.0 wt %, based on a weight of the supported catalyst, of a combined amount of platinum and Group VIII metal, such as palladium. A weight ratio of platinum and Group VIII metal can be from 0.1 to 10. The supported catalyst can have a catalyst width and an average platinum content per volume. A peak platinum content per volume across the catalyst width can differ from the average platinum content per volume by less than 100% of the average platinum content per volume. The supported catalyst can be used, for example, to hydroprocess a feed having an aromatics content of at least 5 wt % to form a hydroprocessed effluent.

DETAILED DESCRIPTION

Figure 1:
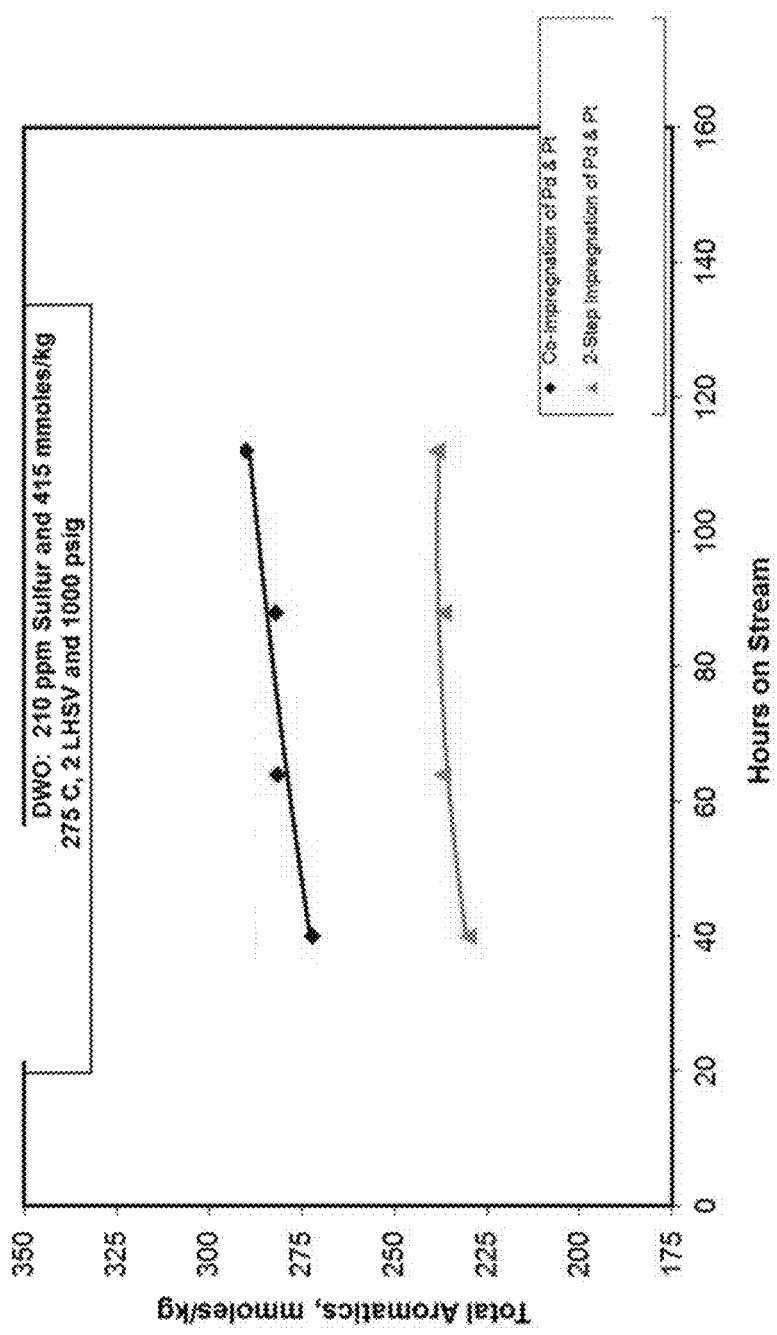
FIG. 1 shows results from performing aromatic saturation of a feed using a co-impregnated Pt—Pd catalyst and a sequentially impregnated Pt—Pd catalyst.

All numerical values within the detailed description and the claims herein are modified by "about" or "approximately" the indicated value, and take into account experimental error and variations that would be expected by a person having ordinary skill in the art.

In various aspects, methods are provided for forming noble metal catalysts comprising both platinum and palladium with improved aromatic saturation activity. Instead of impregnating a catalyst with both platinum and palladium at the same time, a sequential impregnation can be used, with palladium being impregnated prior to platinum. It has been discovered that by forming a palladium-impregnated catalyst first, and then impregnating with platinum, the distribution of platinum throughout the catalyst can be improved. More generally, other Group VIII metals (including non-noble metals) such as Ni, Rh, Ir, Ru, and Co could also be used for an initial impregnation to improve the subsequent distribution of platinum. The improved distribution of platinum can result in a catalyst with enhanced aromatic saturation activity relative to a catalyst with a similar composition formed by simultaneous impregnation. Platinum and palladium catalysts (and more generally other Group VIII metal plus platinum catalysts) with improved platinum metal distribution are also described herein.

Impregnation, such as impregnation by incipient wetness or ion exchange in solution, is a commonly used technique for introducing metals into a catalyst that includes a support, such as a zeolitic support and/or a mesoporous support. The total acidity of the support (Bronsted and Lewis) affects the dispersion of metals during impregnation by exchanging with the metal precursors. When performing incipient wetness impregnation onto a sufficiently acidic material, such as a zeolite, the metal can often "rim" or deposit primarily on the outside of the shaped extrudate or pores. The rimming of the metal is an inefficient use of metal, as it can limit the metal available throughout the remaining portions of the catalyst. For reactions such as aromatic saturation or dewaxing, the activity of the catalyst can be dependent on the activity of the catalyst throughout the catalyst support. During impregnation, a support is exposed to a solution containing a salt of the metal for impregnation. There are many variables that can affect the dispersion of the metal salt during impregnation, including the concentration of the salt, the pH of the salt solution, the point of zero charge of the support material, but not excluding other variables that may also be important during incipient wetness or ion exchange impregnation. Multiple exposure steps can optionally be performed to achieve a desired metals loading on a catalyst. After impregnating a support with a metal salt, the support can be calcined under effective calcination conditions to convert the metal salt to a metal oxide. For example, the support can be calcined in an atmosphere containing 5 vol % to 30 vol % $O_2$ at a temperature of 500° F. (260° C.) to 800° F. (427° C.) for 0.5 hours to 24 hours. Optionally, the support can be dried at a lower temperature for a period of time prior to calcination so that water from the impregnation solution can be removed prior to starting the calcination procedure.

One convenient way of characterizing the acidity of a catalyst is using the Alpha value test. The alpha value test is a measure of the cracking activity of a catalyst and is described in U.S. Pat. No. 3,354,078 and in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395. In various aspects, the sequential impregnation described herein can be used for a support having an Alpha value of at least 100, or at least 200, or at least 250, or at least 300, or at least 350, or at least 400.

Typically impregnation can occur after extrusion of a zeolitic and/or mesoporous catalyst. If the catalyst includes a binder, the zeolitic and/or mesoporous catalyst component can be combined with the binder and then extruded.

Currently, platinum catalysts, palladium catalysts, and catalysts including both platinum and palladium catalysts are used for various types of catalyst processing, including hydrocracking, catalytic dewaxing, and hydrofinishing. Catalysts including both platinum and palladium can be synthesized by co-impregnation of platinum and palladium complexes onto a catalytic support. The catalyst is then dried to remove water and the complexes are decomposed (i.e., via calcination) in air to produce dispersed platinum and palladium oxides on the surface.

Conventionally, the effectiveness of a metal impregnation can be measured by determining the dispersion of metals on the surface. An example of a technique for measuring catalyst dispersion is oxygen chemisorption. During an oxygen chemisorption test, a Langmuir adsorption model is used to identify a distinction between chemisorption and physisorption of oxygen on the metal surface. The amount of oxygen adsorbed by chemisorption is then compared with an expected amount of surface adsorption sites (such as surface metal atoms) to determine a dispersion value.

It has been discovered that dispersion (such as dispersion measured by oxygen chemisorption) does not correlate well with aromatic saturation activity for catalysts including Pt as a hydrogenation metal. Without being bound by any particular theory, it is believed that dispersion measurements provide an indication of distribution of metals on the surface of a catalyst. However, for many types of molecular sieves and/or porous amorphous catalysts, a substantial portion of the catalyst activity can be based on activity within the pores of the catalyst. Distribution of metals across the width of a catalyst is believed to not be strongly correlated with the values generated by dispersion measurements. Instead, it has been determined that an improved understanding of the activity of a catalyst can be gained by performing energy dispersive x-ray spectroscopy (EDS) analysis using a scanning electron microscope (SEM) to characterize the distribution of metal content (either Pt or combined Pt and Pd) across the width of a catalyst.

As further detailed in the Examples below, it has been determined using EDS that when platinum and palladium are co-impregnated, the platinum (and optionally the palladium) may preferentially adsorb on the outside of a mesoporous or zeolitc support and segregate. This can result in a lower concentrations of platinum (and optionally palladium) within the pore structure of the catalyst. This preferential adsorption of platinum (and optionally palladium) at the surface of a mesoporous support, zeolitic support, and/or other type of molecular sieve support can lead to a catalyst with lower aromatic saturation activity.

To overcome this difficulty, it has been discovered that sequential impregnation can improve the distribution of metals across the width (i.e., within the interior) of a catalyst. During sequential impregnation, at least a portion of the palladium salt(s) impregnated on the support can be decomposed (such as by calcination) prior to impregnation of at least a portion of the platinum salts on the support. Performing a sequential impregnation where palladium is impregnated first, and then platinum is impregnated on the palladium-containing catalyst, can result in improved distribution of platinum (and optionally palladium) across the width of a catalyst. This improved distribution is believed to lead to additional formation of higher activity alloys of platinum and palladium.

The improved distribution of platinum (and optionally palladium) across the width of a catalyst can result in improved aromatic saturation activity for catalysts including platinum and palladium. This can include improved aromatic saturation activity for aromatic saturation catalysts, dewaxing catalysts, hydrocracking catalysts, and/or any other type of catalyst used for processing of aromatic containing feeds in an environment where hydrogen is present.

In this discussion, the distribution of platinum and palladium across the width of a catalyst can be characterized based on the metal content per volume of the catalyst across the width. The metal content per volume for a catalyst can be determined across the width of the catalyst using EDS analysis. For example, after forming a catalyst, the catalyst can be cut and half and a line scan can be performed across the width of the cut surface of the catalyst.

Figure 2:
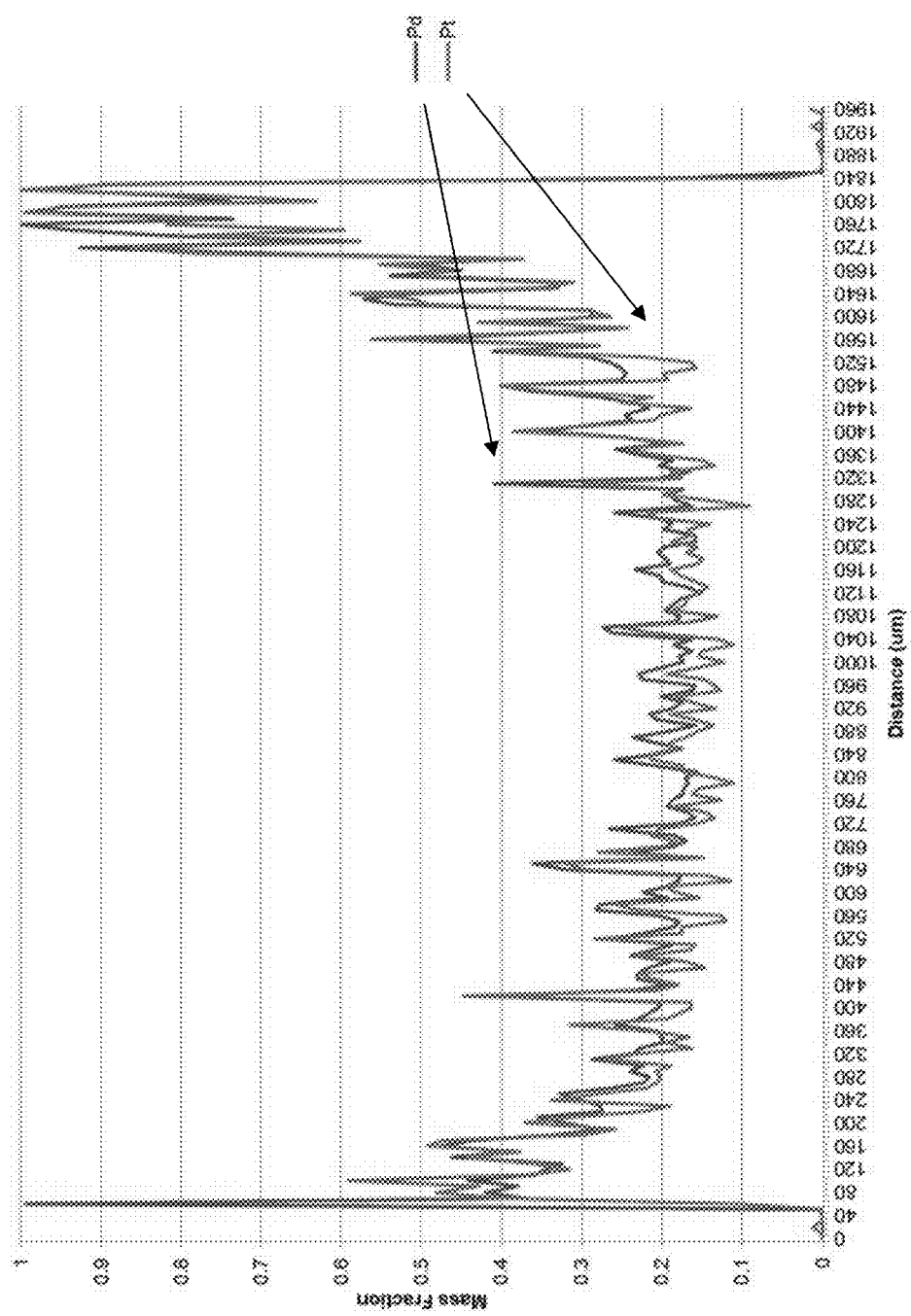
FIG. 2 shows metal content per volume across the catalyst width for a Pt—Pd catalyst formed using co-impregnation.
Figure 3:
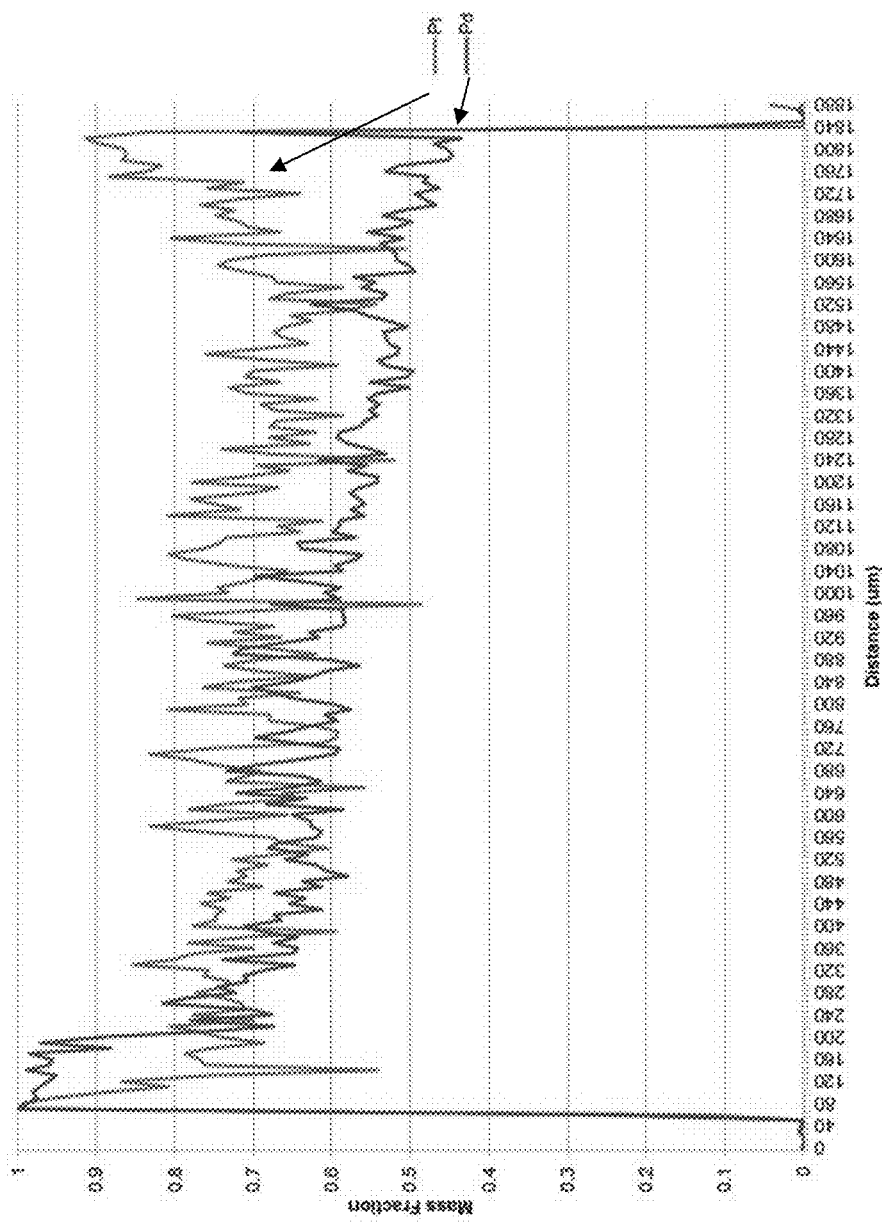
FIG. 3 shows metal content per volume across the catalyst width for a Pt—Pd catalyst formed using sequential impregnation.

An example of EDS characterization of two catalysts is shown in FIGS. 2 and 3. In FIGS. 2 and 3, the metal content of the catalyst is normalized so that the maximum metal content per volume has a value of 1. As shown in FIGS. 2 and 3, the metal content per volume across a catalyst width can vary as a function of width. The metal content per volume across the width of a catalyst can then be compared with the average metal content per volume, such as by comparing a peak metal content relative to the average metal content. A peak metal content is defined herein as either a maximum metal content or a minimum metal content for the metal content per volume across the width of the catalyst. (For FIGS. 2 and 3, based on the normalization used for the data, the peak metal content corresponds to a value of "1" by definition.) The average metal content per volume can be determined in any convenient manner for determining a number average based on the metal content per volume across the width of a catalyst.

In some aspects, a peak metal content per volume and an average metal content per volume can be determined for platinum on the catalyst. In such aspects, for a catalyst formed by sequential impregnation as described herein, the peak platinum content per volume across the width of a catalyst can differ from the average platinum content per volume for the catalyst by less than 200% of the average platinum content per volume, or less than 100%, or less than 75%, or less than 50%. It is noted that a peak platinum content that varies by more than 100% relative to the average platinum content per volume can necessarily correspond to a maximum peak. For variations of less than 100%, a peak platinum content can correspond to either a minimum peak or a maximum peak for the platinum content per volume relative to the average platinum content per volume.

In other aspects, a peak metal content per volume and an average metal content per volume can be determined for a combined amount of platinum and palladium on the catalyst. In such aspects, for a catalyst formed by sequential impregnation as described herein, the peak metal content (combined platinum and palladium) per volume across the width of a catalyst can differ from the average metal content (combined platinum and palladium) per volume for the catalyst by less than 200% of the average metal content per volume, or less than 100%, or less than 75%, or less than 50%.

More generally, a zeolitic catalyst, mesoporous catalyst, and/or other type of molecular sieve-based catalyst that includes platinum and palladium as catalytic metals can be used to catalyze a wide variety of organic compound conversion processes including many of present commercial/industrial importance. Examples of chemical conversion processes effectively catalyzed by the crystalline material of this disclosure, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from about 10° C. to about 250° C., a pressure from about 0 psig to about 500 psig (about 3.5 MPag), a total weight hourly space velocity (WHSV) from about 0.5 $hr^{-1}$ to about 100 $hr^{-1}$, and an aromatic/olefin mole ratio from about 0.1 to about 50;

(b) alkylation of aromatics with long chain (C.sub.10-C.sub.20) olefins, in the gas or liquid phase, with reaction conditions optionally including one or more of a temperature from about 250° C. to about 500° C., a pressure from about 0 psig to 500 psi, (about 3.5 MPag), a total WHSV from about 0.5 $hr^{-1}$ to about 50 $hr^{-1}$, and an aromatic/olefin mole ratio from about 1 to about 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from about 100° C. to about 500° C., a pressure from about 1 psig (about 7 kPag) to about 500 psig (about 3.5 MPag), and a WHSV from about 1 $hr^{-1}$ to about 10,000 $hr^{-1}$;

(d) disproportionation of alkylaromatics, e.g., disproportionation of toluene to produce xylenes, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen/hydrocarbon mole ratio from 0 (no added hydrogen) to about 50;

(e) dealkylation of alkylaromatics, e.g., deethylation of ethylbenzene, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen to hydrocarbon mole ratio from 0 (no added hydrogen) to about 50;

(f) isomerization of alkylaromatics, such as xylenes, with reaction conditions optionally including one or more of a temperature from about 200° C. to about 540° C., a pressure from about 100 kPaa to about 7 MPaa, a WHSV from about 0.1 $hr^{-1}$ to about 50 $hr^{-1}$, and a hydrogen/hydrocarbon mole ratio from 0 (no added hydrogen) to about 10;

(g) reaction of paraffins with aromatics, e.g., to form alkylaromatics and light gases, with reaction conditions optionally including one or more of a temperature from about 260° C. to about 375° C., a pressure from about 0 psig to about 1000 psig (about 6.9 MPag), a WHSV from about 0.5 $hr^{-1}$ to about 10 $hr^{-1}$, and a hydrogen/hydrocarbon mole ratio from 0 (no added hydrogen) to about 10;

(h) paraffin isomerization to provide branched paraffins with reaction conditions optionally including one or more of a temperature from about 200° C. to about 315° C., a pressure from about 100 psig (about 690 kPag) to about 1000 psig (about 6.9 MPag), a WHSV from about 0.5 $hr^{-1}$ to about 10 $hr^{-1}$, and a hydrogen to hydrocarbon mole ratio from about 0.5 to about 10;

(i) alkylation of iso-paraffins, such as isobutane, with olefins, with reaction conditions optionally including one or more of a temperature from about −20° C. to about 350° C., a pressure from about 0 psig to about 700 psig (about 4.9 MPag), and a total olefin WHSV from about 0.02 $hr^{-1}$ to about 10 $hr^{-1}$;

(j) dewaxing of paraffinic feeds with reaction conditions optionally including one or more of a temperature from about 200° C. to about 450° C., a pressure from about 0 psig to about 1000 psig (about 6.9 MPag), a WHSV from about 0.2 $hr^{-1}$ to about 10 $hr^{-1}$, and a hydrogen/hydrocarbon mole ratio from about 0.5 to about 10;

(k) cracking of hydrocarbons with reaction conditions optionally including one or more of a temperature from about 300° C. to about 700° C., a pressure from about 0.1 atm (about 10 kPag) to about 30 atm (about 3 MPag), and a WHSV from about 0.1 $hr^{-1}$ to about 20 $hr^{-1}$;

(l) isomerization of olefins with reaction conditions optionally including one or more of a temperature from about 250° C. to about 750° C., an olefin partial pressure from about 30 kPa to about 300 kPa, and a WHSV from about 0.5 $hr^{-1}$ to about 500 $hr^{-1}$; and (m) a hydrocarbon trap (e.g., pre-catalytic converter adsorbent) for cold start emissions in motor vehicles.

In this discussion, a "zeolitic" catalyst is defined as a catalyst that includes a framework structure geometry that corresponds to a known framework type. Examples of known frameworks are those frameworks documented in the database of zeolite structures by the International Zeolite Association. A zeolite, which is a type of zeolitic catalyst, can have a framework structure that is substantially composed of silicon, aluminum, and oxygen. For zeolitic catalysts that are not zeolites, other heteroatoms may form part of the framework structure, including structures where silicon and/or aluminum are entirely replaced within the framework structure. Other types of know zeolitic catalysts include, but are not limited to, silicoaluminophosphates (SAPOs); aluminophosphates (AlPOs); and/or other catalysts having a zeolite framework structure where a portion of the silicon and/or aluminum atoms in the framework are replaced with other elements, such elements including but not being limited to titanium, gallium, phosphorous, germanium, tin, boron, antimony, and zinc.

Processing Conditions—Aromatic Saturation

In some aspects, catalysts that can benefit from improved aromatic saturation activity can include hydroprocessing catalysts, such as aromatic saturation catalysts (sometimes referred to as hydrofinishing catalysts), dewaxing catalysts, and hydrocracking catalysts.

Aromatic saturation can be performed at various locations within a hydroprocessing reaction system. For example, aromatic saturation can be performed prior to other hydroprocessing steps, after a sequence of hydroprocessing steps, or as an intermediate process in a sequence of hydroprocessing steps.

Suitable aromatic saturation catalysts can correspond to catalysts containing a combination of Pt and Pd, with Pd being added first by sequential impregnation. Some examples of mesoporous support materials for hydrofinishing catalysts can include crystalline materials belonging to the M41S class or family of catalysts. The M41S family of catalysts are mesoporous materials having high silica content. Examples include MCM-41, MCM-48 and MCM-50. A preferred member of this class is MCM-41. Other suitable mesoporous materials can include, but are not limited to, amorphous metal oxide supports such as silica, alumina, silica-aluminas, titania, silica-titania, alumina-titania, zirconia, silica-zirconia, titania-zirconia, ceria, tungsten oxide, and combinations thereof. In some aspects an amorphous support can be composed of alumina. The support materials may also be modified, such as by halogenation, or in particular fluorination. The combined amount of Pt and Pd on the catalyst can be 0.1 wt % to 2.0 wt % based on the weight of the catalyst, such as 0.1 wt % to 1.8 wt %, or 0.1 wt % to 1.5 wt %, or 0.1 wt % to 1.2 wt %, or 0.1 wt % to 0.9 wt %, or 0.3 wt % to 1.8 wt %, or 0.3 wt % to 1.5 wt %, or 0.3 wt % to 1.2 wt %, or 0.3 wt % to 0.9 wt %, or 0.6 wt % to 1.8 wt %, or 0.6 wt % to 1.5 wt %, or 0.6 wt % to 1.2 wt %. The Pt and Pd can be included in any convenient weight ratio, such as a Pt to Pd weight ratio of 0.1 (i.e., 1 part Pt to 10 parts Pd) to 10.0 (i.e., 10 parts Pt to 1 part Pd). For example, the Pt to Pd ratio can be 0.1 to 10.0, or 0.1 to 5.0, or 0.1 to 4.0, or 0.1 to 3.0, or 0.1 to 2.0, or 0.1 to 1.5, or 0.1 to 1.0, or 0.2 to 10.0, or 0.2 to 5.0, or 0.2 to 4.0, or 0.2 to 3.0, or 0.2 to 2.0, or 0.2 to 1.5, or 0.2 to 1.0, or 0.2 to 0.5, or 0.3 to 10.0, or 0.3 to 5.0, or 0.3 to 4.0, or 0.3 to 3.0, or 0.3 to 2.0, or 0.3 to 1.5, or 0.3 to 1.0, or 0.3 to 0.5, or 0.5 to 10.0, or 0.5 to 5.0, or 0.5 to 4.0, or 0.5 to 3.0, or 0.5 to 2.0, or 0.5 to 1.5, or 0.5 to 1.0. In some preferred aspects, the weight ratio of Pt to Pd can be 0.2 to 1.5, or 0.3 to 1.5, or 0.2 to 1.0, or 0.3 to 1.0. Optionally, other metals can also be present on the catalyst.

Aromatic saturation conditions can include temperatures from about 125° C. to about 425° C., preferably about 180° C. to about 280° C., total pressures from about 300 psig (2.1 MPa) to about 3000 psig (20.7 MPa), preferably about 1000 psig (6.9 MPa) to about 2500 psig (17.2 MPa), liquid hourly space velocities from about 0.1 hr$^{-1}$ to about 30 hr$^{-1}$ LHSV, or about 0.5 hr$^{-1}$ to about 30 hr$^{-1}$, or about 0.5 hr$^{-1}$ to about 20 hr$^{-1}$, or about 1.0 hr$^{-1}$ to about 20 hr$^{-1}$, preferably about 1.0 hr$^{-1}$ to about 15 hr$^{-1}$, about 1.5 hr$^{-1}$ to about 15 hr$^{-1}$, or about 1.0 hr$^{-1}$ to about 10 hr$^{-1}$, or about 1.5 hr$^{-1}$ to about 10 hr$^{-1}$, or about 2.0 hr$^{-1}$ to about 20 hr$^{-1}$, or about 2.0 hr$^{-1}$ to about 15 hr$^{-1}$, and treat gas rates of from 35.6 m$^3$/m$^3$ to 1781 m$^3$/m$^3$ (200 SCF/B to 10,000 SCF/B), preferably 213 m$^3$/m$^3$ to about 1068 m$^3$/m$^3$ (1200 SCF/B to 6000 SCF/B) of a hydrogen-containing treat gas. The hydrogen-containing treat gas can contain at least about 80 vol % $H_2$, or at least about 90 vol %, or at least about 95 vol %, or at least about 98 vol %.

The aromatic saturation conditions can be effective for reducing the aromatics content of a feed. In various aspects, a feed can be a hydrocarbonaceous feed that includes at least 50 wt % (or at least 75 wt % or at least 90 wt %) of hydrocarbon compounds and/or hydrocarbon-like compounds that may also include one or more heteroatoms, such as sulfur, oxygen, and/or nitrogen. A feed to an aromatics saturation step (and/or dewaxing and/or hydrocracking) can have an aromatics content of at least 5 wt %, or at least 10 wt %, or at least 15 wt %, or at least 20 wt % or at least 25 wt %, or at least 30 wt %, or at least 40 wt %, or at least 50 wt %, or at least 60 wt %, such as up to 80 wt % or more. The sulfur content can be, for example, 1000 wppm or less, or 5000 wppm or less, or 100 wppm or less, or 50 wppm or less. The boiling range of the feed can be any convenient boiling range, such as a naphtha boiling range feed, a distillate boiling range feed, a gas oil boiling range feed, a still higher boiling range feed, or a combination thereof. In this discussion, the distillate boiling range is defined as 350° F. (177° C.) to 700° F. (371° C.). With regard to other boiling ranges, the gas oil boiling range is defined as 700° F. (371° C.) to 1100° F. (593° C.) and the naphtha boiling range is defined as 100° F. (37° C.) to 350° F. (177° C.). Optionally, at least a portion of the feed can be derived from a biological source.

In some aspects, the amount of aromatics in the effluent from an aromatics saturation step can be characterized based on a weight percent of aromatics in the effluent. The aromatics content after aromatics saturation (and/or dewaxing and/or hydrocracking) can be dependent on the initial amount of aromatics in the feed, and can generally be less than 50 wt %, or less than 40 wt %, or less than 30 wt %, or less than 20 wt %, or less than 10 wt %, or less than 7.5 wt %, or less than 5 wt %, or less than 3 wt %. In other aspects, the amount of aromatics in the effluent can be characterized relative to the amount of aromatics in the feed to the aromatics saturation step. For example, a ratio of aromatics in the effluent from aromatics saturation to aromatics in the feed can be 0.6 or less, or 0.5 or less, or 0.4 or less, or 0.3 or less, or 0.2 or less, or 0.15 or less, or 0.1 or less.

Processing Conditions—Catalytic Dewaxing

Another type of catalyst that can benefit from improved aromatic saturation activity is a dewaxing catalyst that includes both platinum and palladium. For example, dewaxing catalysts can be used as part of a hydroprocessing sequence for formation of distillate fuels and/or lubricant base oils. Distillate fuel products and lubricant base oil products can, in some aspects, benefit from lower aromatics contents. A dewaxing catalyst with improved aromatic saturation activity can reduce or minimize the severity required in a subsequent aromatic saturation (or other hydroprocessing) stage and/or can potentially eliminate the need for a subsequent aromatic saturation stage.

Suitable dewaxing catalysts can include molecular sieves such as crystalline aluminosilicates (zeolites) and other zeolitic molecular sieve structures. In an embodiment, the molecular sieve can comprise, consist essentially of, or be ZSM-5, ZSM-22, ZSM-23, ZSM-35, ZSM-48, zeolite Beta, ZSM-57, or a combination thereof, for example ZSM-23 and/or ZSM-48, or ZSM-48 and/or zeolite Beta. Optionally but preferably, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Preferred materials are EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the disclosure are catalysts with a low ratio of silica to alumina. For example, for ZSM-48, the ratio of silica to alumina in the zeolite can be less than 200:1, or less than 110:1, or less than 100:1, or less than 90:1, or less than 80:1. In various embodiments, the ratio of silica to alumina can be from 30:1 to 200:1, 60:1 to 110:1, or 70:1 to 100:1.

In various aspects, a dewaxing catalyst can also include platinum and palladium as a metal hydrogenation component. The amount of combined Pt and Pd on the catalyst can be from 0.1 wt % to 5 wt %, preferably from 0.1 wt % to 2.0 wt %, or 0.2 wt % to 1.8 wt %, or 0.4 wt % to 1.5 wt %. More generally, the amount of combined Pt and Pd on the catalyst can be 0.1 wt % to 2.0 wt %, or 0.1 wt % to 1.8 wt %, or 0.1 wt % to 1.5 wt %, or 0.1 wt % to 1.2 wt %, or 0.2 wt % to 2.0 wt %, or 0.2 wt % to 1.8 wt %, or 0.2 wt % to 1.5 wt %, or 0.2 wt % to 1.2 wt %, or 0.4 wt % to 2.0 wt %, or 0.4 wt % to 1.8 wt %, or 0.4 wt % to 1.5 wt %, or 0.4 wt % to 1.2 wt %, or 0.6 wt % to 2.0 wt %, or 0.6 wt % to 1.8 wt %, or 0.6 wt % to 1.5 wt %, or 0.6 wt % to 1.2 wt %. The Pt and Pd can be included in any convenient weight ratio, such as a Pt to Pd weight ratio of 0.1 (i.e., 1 part Pt to 10 parts Pd) to 10.0 (i.e., 10 parts Pt to 1 part Pd). For example, the Pt to Pd ratio can be 0.1 to 10.0, or 0.1 to 5.0, or 0.1 to 4.0, or 0.1 to 3.0, or 0.1 to 2.0, or 0.1 to 1.5, or 0.1 to 1.0, or 0.2 to 10.0, or 0.2 to 5.0, or 0.2 to 4.0, or 0.2 to 3.0, or 0.2 to 2.0, or 0.2 to 1.5, or 0.2 to 1.0, or 0.2 to 0.5, or 0.3 to 10.0, or 0.3 to 5.0, or 0.3 to 4.0, or 0.3 to 3.0, or 0.3 to 2.0, or 0.3 to 1.5, or 0.3 to 1.0, or 0.3 to 0.5, or 0.5 to 10.0, or 0.5 to 5.0, or 0.5 to 4.0, or 0.5 to 3.0, or 0.5 to 2.0, or 0.5 to 1.5, or 0.5 to 1.0. In some preferred aspects, the weight ratio of Pt to Pd can be 0.2 to 1.5, or 0.3 to 1.5, or 0.2 to 1.0, or 0.3 to 1.0. Optionally, other metals can also be present on the catalyst.

Process conditions in a catalytic dewaxing zone can include a temperature of about 200° C. to about 450° C., preferably about 270° C. to about 400° C., a hydrogen partial pressure of about 1.8 MPag to about 34.6 MPag (250 psig to 5000 psig), preferably about 4.8 MPag to about 20.8 MPag, and a hydrogen treat gas rate of about 35.6 m$^3$/m$^3$ (200 SCF/B) to about 1781 m$^3$/m$^3$ (10,000 scf/B), preferably about 178 m$^3$/m$^3$ (1000 SCF/B) to about 890.6 m$^3$/m$^3$ (5000 SCF/B). In still other embodiments, the conditions can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF. The LHSV can be from about 0.1 to about 10 h$^{-1}$, such as from about 0.5 h$^{-1}$ to about 5 and/or from about 1 to about 4 h$^{-1}$.

Processing Conditions—Hydrocracking in Sweet Operation

Hydrocracking processes are still another type of process that can benefit from a catalyst including both platinum and palladium that has improved aromatic saturation activity. Generally, hydrocracking catalysts including platinum and palladium can correspond to catalysts used during a "sweet" hydrocracking stage, where the sulfur content of a feed to the hydrocracking process is 1000 wppm or less, or 500 wppm or less, or 100 wppm or less, or 50 wppm or less.

Hydrocracking catalysts typically contain metals, such as platinum and palladium, on acidic supports. Examples of acidic supports include cracking zeolites and/or other cracking molecular sieves such as USY, amorphous silica alumina, or acidified alumina. In some preferred aspects, a hydrocracking catalyst can include at least one molecular sieve, such as a zeolite. Often these acidic supports are mixed or bound with other metal oxides such as alumina, titania or silica. Support materials which may be used can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

The combined amount of supported Pt and Pd on the catalyst can be 0.1 wt % to 2.0 wt % based on the weight of the catalyst, such as 0.1 wt % to 1.8 wt %, or 0.1 wt % to 1.5 wt %, or 0.1 wt % to 1.2 wt %, or 0.1 wt % to 0.9 wt %, or 0.3 wt % to 1.8 wt %, or 0.3 wt % to 1.5 wt %, or 0.3 wt % to 1.2 wt %, or 0.3 wt % to 0.9 wt %, or 0.6 wt % to 1.8 wt %, or 0.6 wt % to 1.5 wt %, or 0.6 wt % to 1.2 wt %. The Pt and Pd can be included in any convenient weight ratio, such as a Pt to Pd weight ratio of 0.1 (i.e., 1 part Pt to 10 parts Pd) to 10.0 (i.e., 10 parts Pt to 1 part Pd). For example, the Pt to Pd ratio can be 0.1 to 10.0, or 0.1 to 5.0, or 0.1 to 4.0, or 0.1 to 3.0, or 0.1 to 2.0, or 0.1 to 1.5, or 0.1 to 1.0, or 0.2 to 10.0, or 0.2 to 5.0, or 0.2 to 4.0, or 0.2 to 3.0, or 0.2 to 2.0, or 0.2 to 1.5, or 0.2 to 1.0, or 0.2 to 0.5, or 0.3 to 10.0, or 0.3 to 5.0, or 0.3 to 4.0, or 0.3 to 3.0, or 0.3 to 2.0, or 0.3 to 1.5, or 0.3 to 1.0, or 0.3 to 0.5, or 0.5 to 10.0, or 0.5 to 5.0, or 0.5 to 4.0, or 0.5 to 3.0, or 0.5 to 2.0, or 0.5 to 1.5, or 0.5 to 1.0. In some preferred aspects, the weight ratio of Pt to Pd can be 0.2 to 1.5, or 0.3 to 1.5, or 0.2 to 1.0, or 0.3 to 1.0.

In some aspects, a hydrocracking catalyst can include a large pore molecular sieve that is selective for cracking of branched hydrocarbons and/or cyclic hydrocarbons. Zeolite Y, such as ultrastable zeolite Y (USY) is an example of a zeolite molecular sieve that is selective for cracking of branched hydrocarbons and cyclic hydrocarbons. Depending on the aspect, the silica to alumina ratio in a USY zeolite can be at least about 10, such as at least about 15, or at least about 25, or at least about 50, or at least about 100. Depending on the aspect, the unit cell size for a USY zeolite can be about 24.50 Angstroms or less, such as about 24.45 Angstroms or less, or about 24.40 Angstroms or less, or about 24.35 Angstroms or less, such as about 24.30 Angstroms or less. In other aspects, a variety of other types of molecular sieves can be used in a hydrocracking catalyst, such as zeolite Beta and ZSM-5. Still other types of suitable molecular sieves can include molecular sieves having 10-member ring pore channels or 12-member ring pore channels. Examples of molecular sieves having 10-member ring pore channels or 12-member ring pore channels include molecular sieves having zeolite framework structures selected from MRE, MTT, EUO, AEL, AFO, SFF, STF, TON, OSI, ATO, GON, MTW, SFE, SSY, or VET.

In various embodiments, the conditions selected for hydrocracking can depend on the desired level of conversion, the level of contaminants in the input feed to the hydrocracking stage, and potentially other factors.

Suitable hydrocracking conditions can include temperatures of about 450° F. (232° C.) to about 840° F. (449° C.), or about 450° F. (232° C.) to about 800° F. (427° C.), or about 450° F. (249° C.) to 750° F. (399° C.), or about 500° F. (260° C.) to about 840° F. (449° C.), or about 500° F. (260° C.) to about 800° F. (427° C.), or about 500° F. (260° C.) to about 750° F. (399° C.); hydrogen partial pressures of from about 250 psig to about 5000 psig (1.8 MPag to 34.6 MPag); liquid hourly space velocities of from 0.05 $h^{-1}$ to 10 $h^{-1}$; and hydrogen treat gas rates of from 35.6 $m^3/m^3$ to 1781 $m^3/m^3$ (200 SCF/B to 10,000 SCF/B). In other aspects, the conditions can include temperatures in the range of about 500° F. (260° C.) to about 815° F. (435° C.), or about 500° F. (260° C.) to about 750° F. (399° C.), or about 500° F. (260° C.) to about 700° C. (371° C.); hydrogen partial pressures of from about 500 psig to about 3000 psig (3.5 MPag-20.9 MPag); liquid hourly space velocities of from about 0.2 to about 5 $h^{-1}$; and hydrogen treat gas rates of from about 213 $m^3/m^3$ to about 1068 $m^3/m^3$ (1200 SCF/B to 6000 SCF/B).

In some aspects, portion of the hydrocracking catalyst can be contained in different reactor stages. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as about 350° F. (177° C.) or about 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (177° C.) or at least about 400° F. (204° C.) to having an upper end cut point temperature of about 700° F. (371° C.) or less or 650° F. (343° C.) or less. Optionally, the distillate fuel range can be extended to include additional kerosene, such as by selecting a lower end cut point temperature of at least about 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base oils. In such aspects, the portion boiling above the distillate fuel range is subjected to further hydroprocessing in a second hydroprocessing stage for formation of one or more lubricant base oils. Optionally, the lubricant base oil fractions can be distilled and operated in the catalyst dewaxing sections in a blocked operation where the conditions are adjusted to maximize the yield and properties of each base oil.

Additional Configuration—Improved Lube Yield from Unconverted Oil

In some alternative aspects, a method is provided herein for improving the lubricant base oil yield when processing unconverted oil for lubricant production. Unconverted oil refers to the portion of a feed for lubricant base oil production that is not "converted" relative to a conversion temperature, such as a 650° F.+(343° C.) portion or a 700° F.+(371° C.) portion, during a hydrotreating and/or hydrocracking process. Such hydrotreating and/or hydrocracking processes can be used to reduce the sulfur content of a feed as well as providing viscosity index uplift. The unconverted oil after such hydrotreating and/or hydrocracking can have sufficient viscosity, as well as a suitable viscosity index, for formation of lubricant base stocks.

After hydrotreating and/or hydrocracking of a feed, the unconverted oil portion of the feed can be further processed by catalytic dewaxing. The catalytic dewaxing can be used to improve cold flow properties of a lubricant base stock product, such as pour point. Typically, the unconverted oil can also be exposed to aromatic saturation conditions before and/or after dewaxing. It is noted that aromatic saturation of a dewaxed feed may alternatively be referred to as hydrofinishing of a feed. After dewaxing (and optionally after aromatic saturation), the dewaxed feed can be fractionated to form a plurality of desired lubricant base stock products having different viscosities.

During dewaxing of unconverted oil to improve cold flow properties, the dewaxing conditions are typically selected to provide sufficient pour point improvement for the lubricant base stock product with the lowest pour point requirement (or multiple lower pour point products). This can often correspond to the lowest viscosity base stock product, such as a 2 cSt or less, or 3 cSt or less, or 4 cSt or less base stock product. These lower viscosity lubricant base stock products can require low pour points, such as −30° C. or lower, when they are targeted for use in specialty applications such as transformer oils or refrigerator oils. Unfortunately, exposing an unconverted oil feed to sufficiently severe dewaxing conditions to meet the pour point requirement for the lowest viscosity base stock product can result in reducing the pour point of the higher viscosity base stock products formed from the same unconverted oil to pour points that are substantially beyond the required pour point specification. This "overprocessing" of the higher viscosity portions of the unconverted oil can result in loss of in viscosity index for the higher viscosity lubricant base stocks. To compensate for the loss of viscosity index, additional hydrotreatment and/or hydrocracking is typically used, which can provide viscosity index uplift while reducing overall yield of lubricant base oil products.

In various aspects, to address the above difficulties, the unconverted oil from hydrotreating and/or hydrocracking can be dewaxed at sufficient severity for achieving the target pour points of the higher viscosity base stock fractions. The lowest (or optionally multiple lower) viscosity base stock fractions can then be stored and processed again over a dewaxing catalyst under effective conditions to meet the additional cold flow property requirements for the lower viscosity base stock fractions.

Figure 4:
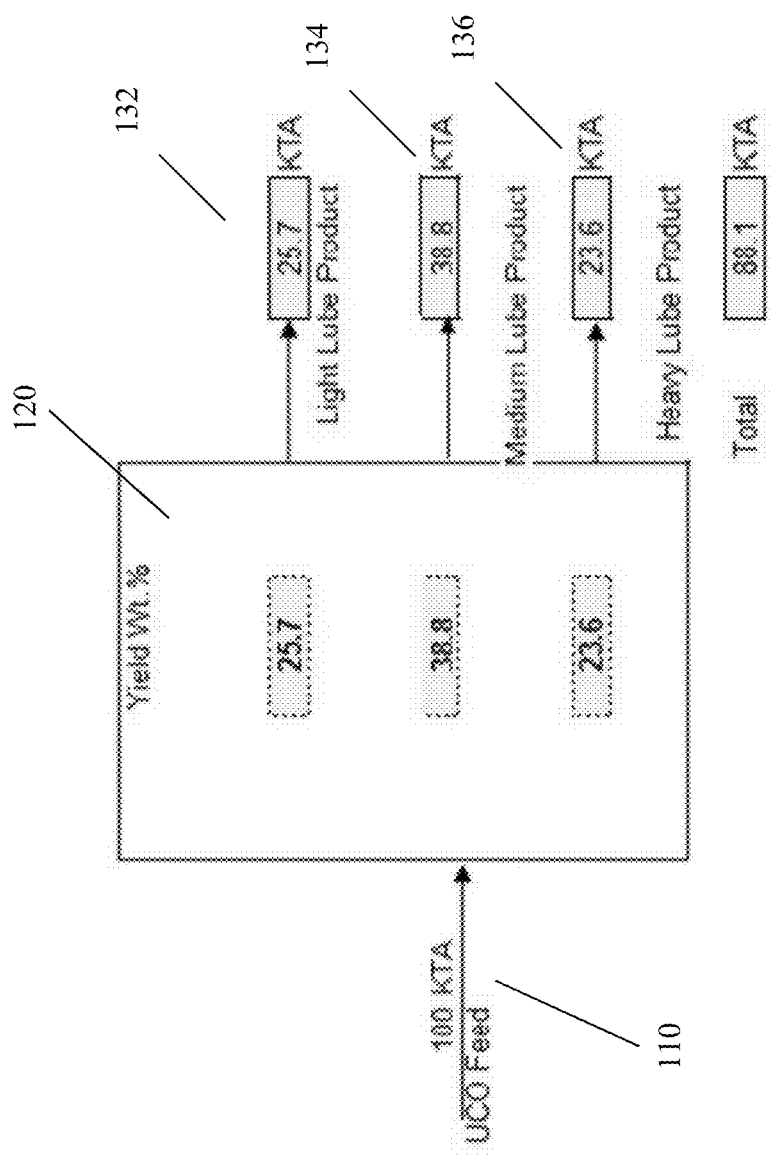
FIG. 4 schematically shows a reaction configuration for hydroprocessing of unconverted oil.
Figure 5:
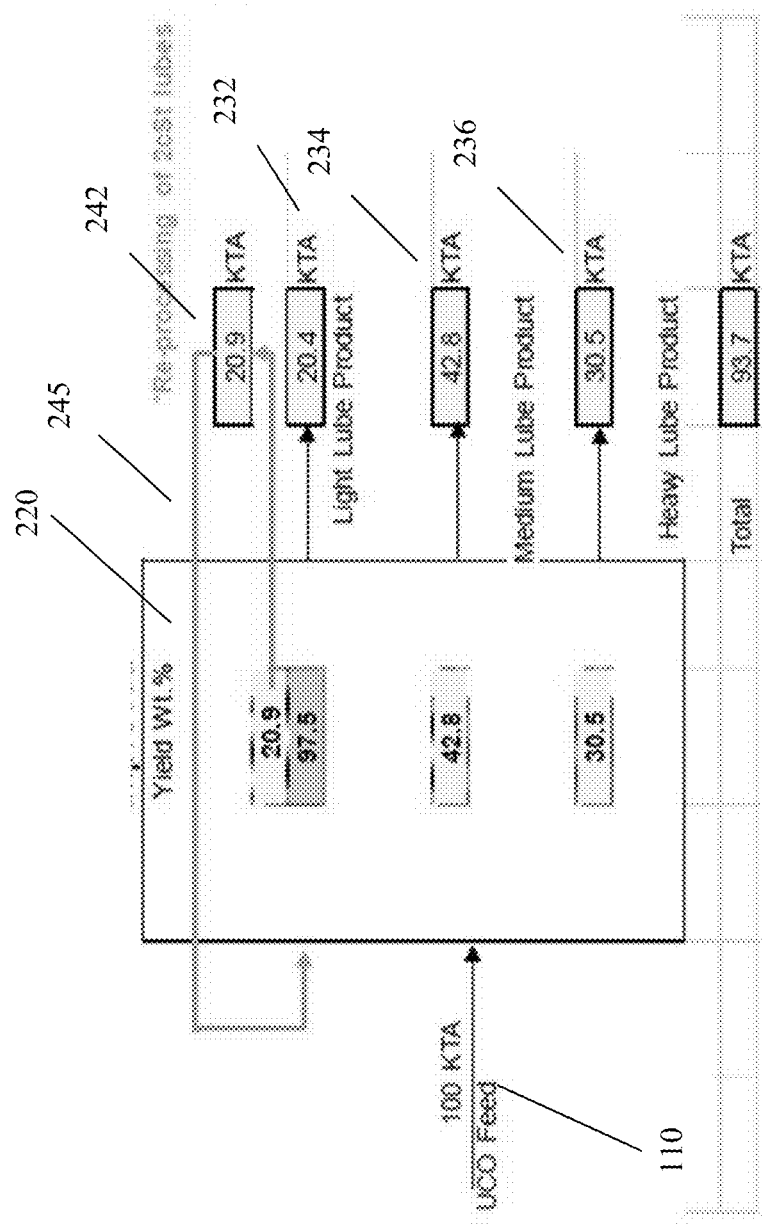
FIG. 5 schematically shows a reaction configuration for hydroprocessing of unconverted oil.

FIGS. 4 and 5 schematically show the difference between wide cut processing of unconverted oil and the processing scheme described herein. In FIGS. 4 and 5, an unconverted oil feed 110 is passed into a hydroprocessing stage 120 that represents both hydrotreatment and dewaxing. In the configuration shown in FIGS. 4 and 5, the effluent from the hydroprocessing stage 120 can be fractionated (not shown) to form a light base oil 132 (such as a 2 cSt oil), a medium base oil 134 (such as a 5-6 cSt oil), and a heavy base oil 136 (such as a 10+ cSt oil).

The configuration in FIG. 4 corresponds to the situation where the entire unconverted oil is dewaxed at a conventional increased severity to achieve the desired pour point for the 2 cSt light base oil 132. To compensate for this, the hydrotreatment portion of hydroprocessing stage 120 is operated at higher severity as well, so that the viscosity index of the medium base oil 134 and heavy base oil 136 will have a desired value. In this prophetic example, the yields for the light base oil 132, medium base oil 134, and heavy base oil 136 are shown in FIG. 4 for operation of the hydrotreatment and dewaxing processes at increased severity.

FIG. 5 demonstrates the yield benefit of operating the dewaxing stage 220 at the lower severity effective conditions for satisfying the pour point for the medium base oil 234 and the heavy base oil 236. As shown in FIG. 5, because the light base oil 234 is not initially dewaxed to a sufficiently low pour point, the light base oil 242 is recycled 245 for exposure to a dewaxing catalyst for a second time to produce an additionally hydroprocessed light base oil 232. This results in a modest additional reduction in yield for light base oil 232. However, the additional loss in yield for light base oil 232 is small relative to the gains in yield for the medium base oil 234 and heavy base oil 236 due to the lower severity hydrotreatment and dewaxing steps. As a result, processing according to the configuration shown in FIG. 5 can result in a net gain in overall lubricant base oil yield of several weight percent, as shown by the difference in total yield of about 88 wt % for the configuration in FIG. 4 versus about 94 wt % for the configuration in FIG. 5.

Additional Configuration—Improved Lube Yield from Unconverted Oil

In some alternative aspects, a method is provided herein for improving the lubricant base oil yield when processing unconverted oil for lubricant production. After hydrotreating and/or hydrocracking of a feed, a separation can be performed on the hydrotreated/hydrocracked effluent to form a roughly 150° C.+ fraction (alternatively a 125° C.+ fraction or a 200° C.+ fraction) and a lower boiling fraction. The lower boiling fraction can undergo further processing to separate out a naphtha boiling range portion from other light ends. The 150° C.+ fraction, which included unconverted oil, can be passed into a dewaxing (and optionally hydrofinishing) stage for formation of one or more naphtha boiling range products, jet fuel boiling range products, diesel boiling range products and lubricant boiling range products.

Unconverted oil refers to the portion of a feed for lubricant base oil production that is not "converted" relative to a conversion temperature, such as a 650° F.+(343° C.) portion or a 700° F.+(371° C.) portion, during a hydrotreating and/or hydrocracking process. Such hydrotreating and/or hydrocracking processes can be used to reduce the sulfur content of a feed as well as providing viscosity index uplift. The unconverted oil after such hydrotreating and/or hydrocracking can have sufficient viscosity, as well as a suitable viscosity index, for formation of lubricant base stocks.

Figure 6:
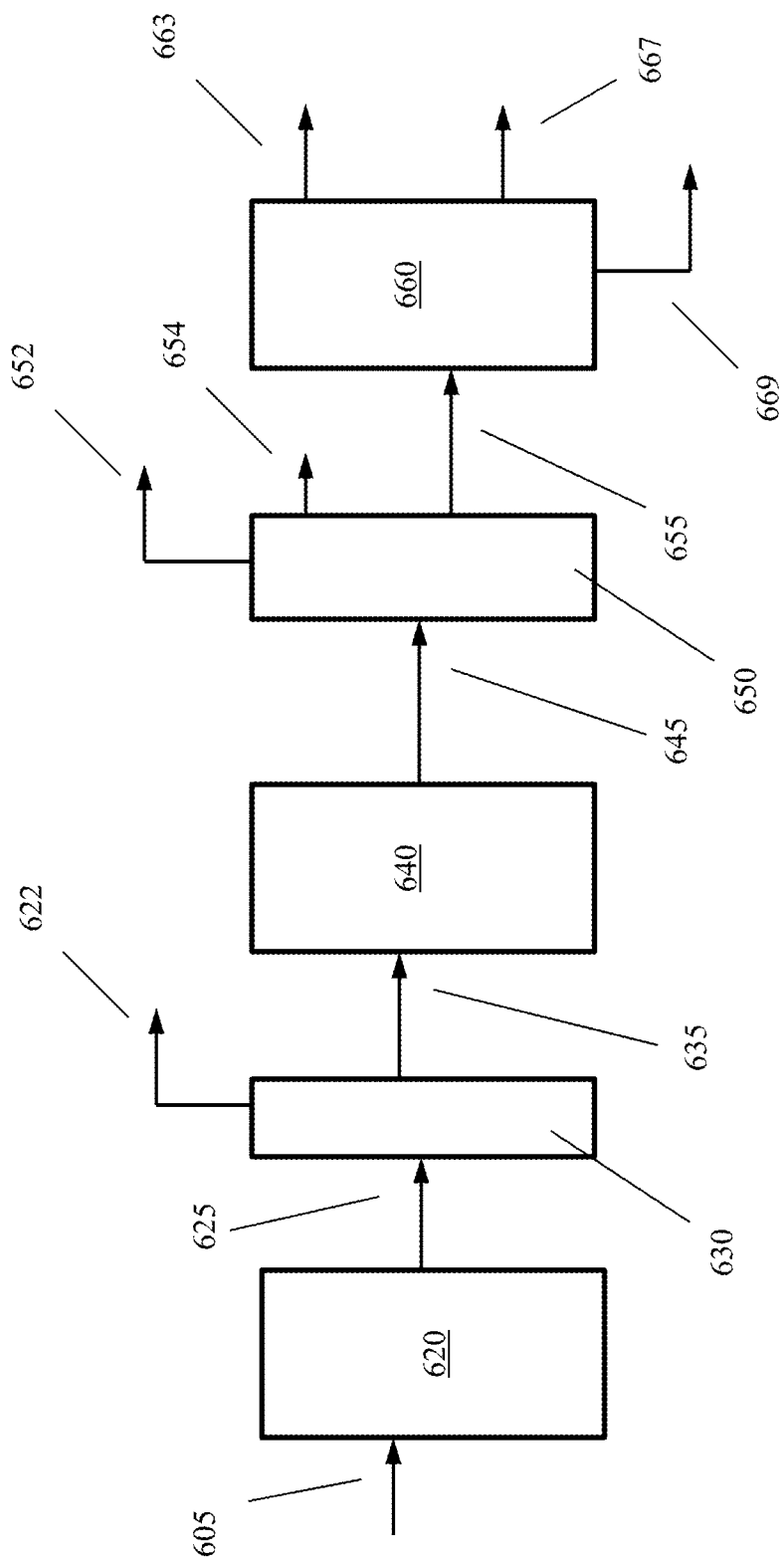
FIG. 6 schematically shows another reaction configuration for hydroprocessing for production of fuels and lubricant base oils.

FIG. 6 shows an example of a process configuration for formation of products from a vacuum gas oil boiling range feed. In FIG. 6, a vacuum gas oil boiling range feed 605 can be passed into a hydrocracker 620. The feed 610 can correspond to a virgin vacuum gas oil, a hydrotreated vacuum gas oil boiling range feed, or another convenient type of feed. The hydrocracker 620 can correspond to a hydrocracker operating under sweet or sour conditions, depending on the nature of feed 610. The hydrocracker effluent 625 can be passed into a stripper 630 (or alternatively another type of separator) for forming a 150° C.+ effluent fraction 635 and a lower boiling fraction 632. The 150° C.+ effluent fraction 635 can then be passed into a catalytic dewaxing stage 640. Optionally, the catalytic dewaxing stage can also include hydrofinishing catalyst, or a separate reaction stage (not shown) can be used for hydrofinishing at any convenient location within the process flow. The dewaxed effluent 645 can then be separated to form desired products. In FIG. 6, a first separation can correspond to an atmospheric distillation 650 to separate out, for example, one or more naphtha boiling range fractions 652, one or more jet fuel boiling range fractions 654, and a bottoms fraction 655. In the configuration shown in FIG. 6, the bottoms fraction 655 then undergoes vacuum distillation 660 to form one or more diesel boiling range fractions 663, one or more lubricant boiling range fractions. The lubricant boiling range fractions shown in FIG. 6 correspond to a light lubricant fraction 667 and a heavy lubricant fraction 669, but any other convenient combination of fractions could be formed. Optionally, some or all of diesel boiling range fractions 663 can be separated out by the atmospheric distillation 650.

ADDITIONAL EMBODIMENTS

Additionally or alternately, the present disclosure can include one or more of the following embodiments.

Embodiment 1

A method of making a supported catalyst, the method comprising: impregnating a support comprising at least one of a zeolitic support and a mesoporous support with a Group VIII metal salt, the Group VIII metal comprising Pd, Ni, Rh, Ir, Ru, Co, or a combination thereof, the Group VIII metal optionally comprising a noble metal and preferably comprising Pd; calcining the support under first effective calcining conditions to form a Group VIII metal-impregnated catalyst; impregnating the Group VIII metal-impregnated catalyst with a platinum salt; and calcining the Group VIII metal-impregnated catalyst under second effective calcining conditions to form a platinum- and Group VIII metal-impregnated catalyst, wherein the platinum- and Group VIII metal-impregnated catalyst comprises a combined amount of platinum and Group VIII metal of 0.1 wt %-5.0 wt % based on the weight of the catalyst.

Embodiment 2

The method of Embodiment 1, wherein the platinum- and Group VIII metal-impregnated catalyst has a catalyst width and an average platinum content per volume, and wherein a peak platinum content per volume across the catalyst width differs from the average platinum content per volume by less than 100% of the average platinum content per volume, or less than 75%, or less than 50%.

Embodiment 3

The method of any of the above embodiments, wherein the Group VIII metal-impregnated catalyst comprises at least 0.1 wt % of Group VIII metal, or at least 0.2 wt %.

Embodiment 4

The method of any of the above embodiments, wherein the first effective calcining conditions and/or the second effective calcining conditions comprise calcining in an atmosphere containing 5 vol % to 30 vol % $O_2$ at a temperature of 500° F. (260° C.) to 800° F. (427° C.) for 0.5 hours to 24 hours.

Embodiment 5

A supported catalyst comprising: a support comprising at least one of a zeolitic support and a mesoporous support; and 0.1 wt % to 5.0 wt %, based on a weight of the supported catalyst, of a combined amount of platinum and a Group VIII metal, a weight ratio of platinum and palladium being from 0.1 to 10, the Group VIII metal comprising Pd, Ni, Rh, Ir, Ru, Co, or a combination thereof, the Group VIII metal optionally comprising a noble metal and preferably comprising Pd, wherein the supported catalyst has a catalyst width and an average platinum content per volume, and wherein a peak platinum content per volume across the catalyst width differs from the average platinum content per volume by less than 100% of the average platinum content per volume, or less than 75%, or less than 50%.

Embodiment 6

The supported catalyst of Embodiment 5, wherein the platinum and Group VIII metal are impregnated on the support, the impregnation optionally being a sequential impregnation of Group VIII metal followed by platinum according to the method of Embodiment 1.

Embodiment 7

The method or supported catalyst of any of the above embodiments, wherein the support comprises a mesoporous M41S support, the support optionally comprising MCM-41.

Embodiment 8

The method or supported catalyst of any of the above embodiments, wherein the support comprises a molecular sieve having a zeolite framework structure.

Embodiment 9

The method or supported catalyst of any of the above embodiments, wherein the platinum- and Group VIII metal-impregnated catalyst or the supported catalyst comprises a combined amount of platinum and Group VIII metal of 0.1 wt % to 2.0 wt %, or 0.2 wt % to 1.8 wt %, or 0.4 wt % to 1.5 wt %.

Embodiment 10

The method or supported catalyst of any of the above embodiments, wherein the platinum- and Group VIII metal-impregnated catalyst or the supported catalyst comprises a platinum to Group VIII metal weight ratio of 0.1-2.0, optionally 0.2-1.0.

Embodiment 11

The method or supported catalyst of any of the above embodiments, wherein the platinum- and Group VIII metal-impregnated catalyst or the supported catalyst has a catalyst width and an average combined platinum and Group VIII metal content per volume, and wherein a peak combined platinum and Group VIII metal content per volume across the catalyst width differs from the average combined platinum and Group VIII metal content per volume by less than 100% of the average combined platinum and Group VIII metal content per volume, or less than 75%, or less than 50%.

Embodiment 12

The method or supported catalyst of any of the above embodiments, wherein the support has an Alpha value of at least 100, or at least 200, or at least 250, or at least 300, or at least 350, or at least 400.

Embodiment 13

A method for hydroprocessing a feed, comprising: exposing a supported catalyst according to any of Embodiments 5-12 or a supported catalyst made according to any of Embodiments 1-4 or 7-12 to a feed having an aromatics content of at least 5 wt % under effective hydroprocessing conditions to form a hydroprocessed effluent.

Embodiment 14

The method of Embodiment 13, wherein the effective hydroprocessing conditions comprise at least one of aromatic saturation conditions, catalytic dewaxing conditions, and hydrocracking conditions, the hydroprocessed effluent optionally having a lower aromatics content than the feed.

Embodiment 15

The method of Embodiment 13 or 14, wherein the feed has an aromatics content of 5 wt % to 80 wt %, or at least 10 wt %, or at least 20 wt %, or at least 30 wt %, the feed optionally comprising a hydrocarbonaceous feed.

EXAMPLES

Examples 1-8: Aromatic Saturation Performance and Dispersion (Oxygen Chemisorption) for Various Catalysts In this example, catalysts were formed by combining ZSM-48 with an alumina binder in a 65:35 weight ratio. The combined ZSM-48 and alumina binder was then extruded to form catalyst particles. The catalyst particles were then impregnated with Pt, Pd, or both Pt and Pd as shown in Table 1. Examples 1, 2, and 3 correspond to impregnation with either Pt or Pd. Examples 4 and 7 correspond to co-impregnation of Pt and Pd. Examples 5, 6, and 8 correspond to sequential impregnation where a desired wt % of Pd was first impregnated onto the bound ZSM-48 extrudate, followed by impregnation of the Pd-ZSM-48 catalyst with a desired amount of Pt.

The catalysts in Examples 1-8 were formed by impregnating the bound ZSM-48 extrudates with tetramine metal complexes of Pt and/or Pd. For single metal or co-impregnated catalysts, the metal impregnated catalysts were dried in still air for 4 hours followed by a calcination in flowing air at 660° F. (350° C.) for 3 hours to decompose the tetraamine metal complexes after each impregnation to produce well dispersed platinum oxide, palladium oxide, or platinum and palladium oxide alloy on the support surface. For the sequentially impregnated catalysts, the catalysts were produced by first impregnating the surface with the palladium complex followed by drying the catalyst in still air for 4 hours and calcining in flowing air at 660° F. (350° C.) for 3 hours to decompose the tetraamine metal complex and produce well dispersed palladium oxide. The resulting Pd-ZSM-48 catalyst was then impregnated with the platinum complex followed by drying the catalyst in still air for 4 hours and calcining in flowing air at 660° F. for 3 hour to decompose the tetraamine metal complex and produce platinum oxide.

TABLE 1

Catalyst Description

| Example | Catalyst Description (All numbers wt %) |
|---|---|
| 1 | 0.6% Pt on 65% ZSM-48/35% Alumina |
| 2 | 0.5% Pd on 65% ZSM-48/35% Alumina |
| 3 | 0.9% Pd on 65% ZSM-48/35% Alumina |
| 4 | 0.3% Pt-0.5% Pd on 65% ZSM-48/35% Alumina |
| 5 | 0.3% Pt on 0.5% Pd on 65% ZSM-48/35% Alumina |
| 6 | 0.5% Pt on 0.5% Pd on 65% ZSM-48/35% Alumina |
| 7 | 0.3% Pt-0.9% Pd on 65% ZSM-48/35% Alumina |
| 8 | 0.3% Pt on 0.9% Pd on 65% ZSM-48/35% Alumina |

Table 2 shows two types of characterizations for the catalysts in Table 1. One type of characterization is an estimated dispersion, or fraction of noble metal surface area, as determined by the strong chemisorption of oxygen. The second characterization is the amount of aromatics conversion under a specified test condition.

With regard to dispersion as measured by oxygen chemisorption, it is noted that the amount of dispersion appeared to have a low correlation with the amount of metals impregnated on the catalyst and a low correlation with the resulting aromatics conversion under the aromatics conversion test conditions. For example, Example 7 (co-impregnation) showed a substantially higher dispersion of metal than Example 8 (sequential impregnation) at the same level of metals loading, but Example 8 had a substantially higher total aromatics conversion. The exception was Example 1 (Pt only) which showed a low dispersion value and a low total aromatics conversion value.

TABLE 2

Dispersion and Aromatics Conversion

| Example | $O_2$ Chem. (O/M) | Total Aromatics Conv. |
|---|---|---|
| 1 | 0.52 | 24.1% ± 0.8% |
| 2 | 0.92 | 58.2% ± 1.3% |
| 3 | 0.57 | 62.3% ± 0.5% |
| 4 | 0.74 | 56.8% ± 0.3% |
| 5 | 0.67 | 64.4% ± 0.1% |
| 6 | 0.73 | 66.3% ± 0.2% |
| 7 | 0.65 | 61.4% ± 0.4% |
| 8 | 0.46 | 72.5% ± 0.2% |

For the aromatics conversion percentage shown in Table 2, the performance of each catalyst for aromatic hydrocarbon saturation (hydrogenation) was determined on a hydrotreated 600 N dewaxed oil. The dewaxed oil was previously hydrotreated to reduce the sulfur content to approximately 70 wppm to be representative of a typical feed for lubricant base stock production prior to dewaxing. Approximately 0.08 g of catalyst sized to a 50/170 mesh was loaded into a batch reactor. After pressure testing with nitrogen, the catalysts were dried in nitrogen at 150° C. for 2 hours followed by reduction in 250 psig (1.7 MPa) $H_2$ at 300° C. for 2 hours. The reactor was then cooled to room temperature and transferred to a glove box under a blanket of nitrogen. After opening the reactor under a blanket of nitrogen, approximately 3 cc of dewaxed oil was introduced to the batch reactor and the reactor was resealed. The aromatic saturation activity test was then conducted for 12 hours at 250° C. with 900 psig (6.2 MPa) of $H_2$.

The total aromatics were measured by UV absorption (mmol $kg^{-1}$). The percentage of total aromatics converted are shown in Table 2. The aromatic saturation experiments were run in quadruplicate to determine a standard deviation on the conversion and show statistical significance. At two different weight loadings (Example 5: 0.3% wt Pt-0.5 wt % Pd and Example 8: 0.3 wt % Pt-0.9 wt % Pd), the sequentially impregnated catalysts showed substantially improved aromatic saturation performance compared to co-impregnated catalysts (Examples 4 and 7) with the same noble metal loading. The addition of 0.5 wt % Pt on 0.5 wt % Pd (Example 6) instead of 0.3 wt % Pt on 0.5 wt % Pd (Example 5) showed only a modest further increase in the aromatic saturation activity of the catalyst. The co-impregnation of Pt and Pd (Examples 4 and 7) on the support appeared to have more similarity in aromatic saturation activity with the samples having only the same amount of Pd (Examples 2 and 3). The Pt only catalysts appeared to be significantly lower in total aromatics activity than the other catalysts.

The results in Table 2 show that the three highest aromatic saturation activities were achieved using sequential impregnation of Pd followed by Pt (Examples 5, 6, and 8). This is in spite of Example 7 having a higher total metals loading that Example 5 or 6. This demonstrates the unexpected benefit of using sequential impregnation of Pd followed by Pt for improving aromatic saturation activity.

Example 9—Aromatic Saturation Catalyst Characterization

The benefit of sequential impregnation of platinum and palladium was also investigated for an aromatic saturation-type catalyst. A support containing 65 wt % MCM-41 and 35 wt % alumina was co-impregnated and sequentially impregnated with platinum and palladium tetraamine nitrates in similar manners to the procedures described above for examples 1-8. A co-impregnated 0.15 wt % Pt and 0.45 wt % Pd on MCM-41 support and sequentially impregnated 0.15 wt % Pt on 0.45 wt % Pd on MCM-41 support were evaluated for aromatic saturation performance for hydrofinishing a 600N dewaxed oil. Approximately 5 cc of each catalyst was loaded into an upflow micro-reactor. About 3 cc of 80-120 mesh sand was added to the catalyst to ensure uniform liquid flow. After pressure testing with nitrogen and hydrogen, the catalysts were dried in nitrogen at 260° C. for about 3 hours, cooled to room temperature, activated in hydrogen at about 260° C. for 8 hours and cooled to 150° C. Then feed was introduced and the operating conditions were adjusted to 2.0 $hr^{-1}$ LHSV, 1000 psig (6.9 MPa), and 2500 scf/b (425 $m^3/m^3$). The reactor temperature was increased to 275° C. and then held constant for about 7-10 days. Hydrogen purity was 100% and no gas recycle was used.

FIG. 1 shows results from the aromatic saturation tests on the 600 N feed. As shown in FIG. 1, the sequentially impregnated catalyst (triangle data points) produced an effluent with a substantially lower aromatics content than the co-impregnated catalyst. This further demonstrates the unexpected benefit of using sequential impregnation of Pd followed by Pt for aromatic saturation activity.

Examples 10 and 11—EDS Characterization

Table 2 appears to demonstrate that sequential impregnation can be used to provide improved aromatics saturation activity. Table 2 also shows that conventional dispersion measurements, such as oxygen chemisorption, cannot distinguish between catalysts with reduced and improved aromatics saturation activity. It has been determined that the differences in aromatic saturation activity for sequentially impregnated catalysts can be characterized at least in part by using energy dispersive x-ray spectroscopy (EDS) analysis using a scanning electron microscope (SEM). EDS can allow for characterization of the metal distribution across the width of a catalyst.

FIG. 2 shows an EDS characterization of the distribution of Pt and Pd metal content across the width of alumina bound ZSM-48 (65:35 weight ratio) for a co-impregnated catalyst. FIG. 3 shows an EDS characterization for a similar catalyst that was formed using sequential impregnation. In FIGS. 2 and 3, the displayed values for each metal are normalized so that the maximum concentration at a given width corresponds to a value of "1". As shown in FIG. 2, both the Pd and Pt contents show increases in metal content near the edges of the catalyst width, which is believed to correspond to increased metal content at the catalyst surface. It is noted that both the Pd and Pt have similar distribution profiles. By contrast, FIG. 3 shows a relatively uniform distribution of both Pd and Pt throughout the width of the catalyst. This is believed to indicate that Pd and Pt are distributed more evenly within the pore network of the catalyst in FIG. 3, as opposed to having metals concentrated at the surface for the catalyst in FIG. 2.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention claimed is:

1. A method for processing a feed using a supported catalyst, comprising:
    exposing a feed having an aromatics content of at least 5 wt % to a supported catalyst under effective aromatic saturation conditions to form an effluent, the supported catalyst comprising:
        a support comprising at least one of a zeolitic support and a mesoporous support, the support having an Alpha value of at least 100; and
        0.1 wt % to 5.0 wt %, based on a weight of the supported catalyst, of a combined amount of platinum and Group VIII metal on the support, a weight ratio of platinum to Group VIII metal being from 0.1 to 10, the Group VIII metal comprising Pd, Ni, Rh, Ir, Ru, Co, or a combination thereof,
    wherein the supported catalyst has a catalyst width and an average platinum content per volume, and wherein a peak platinum content per volume across the catalyst width differs from the average platinum content per volume by less than 100% of the average platinum content per volume.

2. The method of claim 1, wherein the effluent has a lower aromatics content than the feed.

3. The method of claim 1, wherein the feed has an aromatics content of 10 wt % to 80 wt %.

4. The method of claim 1, wherein the platinum and Group VIII metal are impregnated on the support, the impregnation comprising:
    impregnating the support with a Group VIII metal salt;
    calcining the support under first effective calcining conditions to form a Group VIII metal-impregnated catalyst;
    impregnating the Group VIII metal-impregnated catalyst with a platinum salt; and
    calcining the Group VIII metal-impregnated catalyst under second effective calcining conditions to form a platinum- and Group VIII metal-impregnated catalyst.

5. The method of claim 1, wherein the platinum comprises a platinum oxide and the Group VIII metal comprises a Group VIII metal oxide.

6. The method of claim 5, wherein the Group VIII metal oxide comprises palladium oxide.

7. The method of claim 1, wherein the support comprises ZSM-48.

8. The method of claim 1, wherein the Group VIII metal is palladium.

9. The method of claim 1, wherein the weight ratio of platinum to Group VIII metal is from 0.1 to 2.

10. The method of claim 1, wherein the support comprises a mesoporous M41S support.

11. A method for processing a feed using a supported catalyst, comprising:
    exposing a feed having an aromatics content of at least 5 wt % to a supported catalyst under effective aromatic saturation conditions to form an effluent, the supported catalyst comprising:
        a support comprising at least one of a zeolitic support and a mesoporous support, the support having an Alpha value of at least 100, and comprising a 10-member ring in a crystal structure thereof; and
        0.1 wt % to 5.0 wt %, based on a weight of the supported catalyst, of a combined amount of platinum and Group VIII metal on the support, a weight ratio of platinum to Group VIII metal being from 0.1 to 10, the Group VIII metal comprising Pd, Ni, Rh, Ir, Ru, Co, or a combination thereof, wherein the supported catalyst has a catalyst width and an average platinum content per volume, and wherein a peak platinum content per volume across the catalyst width differs from the average platinum content per volume by less than 100% of the average platinum content per volume.

12. The method of claim 11, wherein the platinum comprises a platinum oxide and the Group VIII metal comprises a Group VIII metal oxide.

13. The method of claim 12, wherein the Group VIII metal oxide comprises palladium oxide.

14. The method of claim 11, wherein the support comprises ZSM-48.

15. The method of claim 11, wherein the platinum and Group VIII metal are impregnated on the support, the impregnation comprising:

impregnating the support with a Group VIII metal salt;

calcining the support under first effective calcining conditions to form a Group VIII metal-impregnated catalyst;

impregnating the Group VIII metal-impregnated catalyst with a platinum salt; and calcining the Group VIII metal-impregnated catalyst under second effective calcining conditions to form a platinum- and Group VIII metal-impregnated catalyst.

16. The method of claim 11, wherein the Group VIII metal is palladium.

17. The method of claim 11, wherein the support comprises a mesoporous M41S support.

18. A method for processing a feed using a supported catalyst, comprising:

exposing a feed having an aromatics content of at least 5 wt % to a supported catalyst under effective aromatic saturation conditions to form an effluent, the supported catalyst comprising:

a support comprising at least one of a zeolitic support and a mesoporous support, the support having an Alpha value of at least 100; and 0.1 wt % to 5.0 wt %, based on a weight of the supported catalyst, of a combined amount of platinum and Group VIII metal on the support, a weight ratio of platinum to Group VIII metal being from 0.1 to 10, the Group VIII metal comprising Pd, Ni, Rh, Ir, Ru, Co, or a combination thereof, the platinum comprising platinum oxide, and the Group VIII metal comprising a Group VIII metal oxide, wherein the supported catalyst has a catalyst width and an average platinum content per volume, and wherein a peak platinum content per volume across the catalyst width differs from the average platinum content per volume by less than 100% of the average platinum content per volume.

19. The method of claim 18, wherein the Group VIII metal is palladium.

20. The method of claim 18, wherein the weight ratio of platinum to Group VIII metal is from 0.1 to 2.

* * * * *